No. 655,411. Patented Aug. 7, 1900.
J. O'MEARA.
ELECTRICAL DETECTOR FOR HEAT OR COLD.
(Application filed May 12, 1899.)
(No Model.) 2 Sheets—Sheet 1.
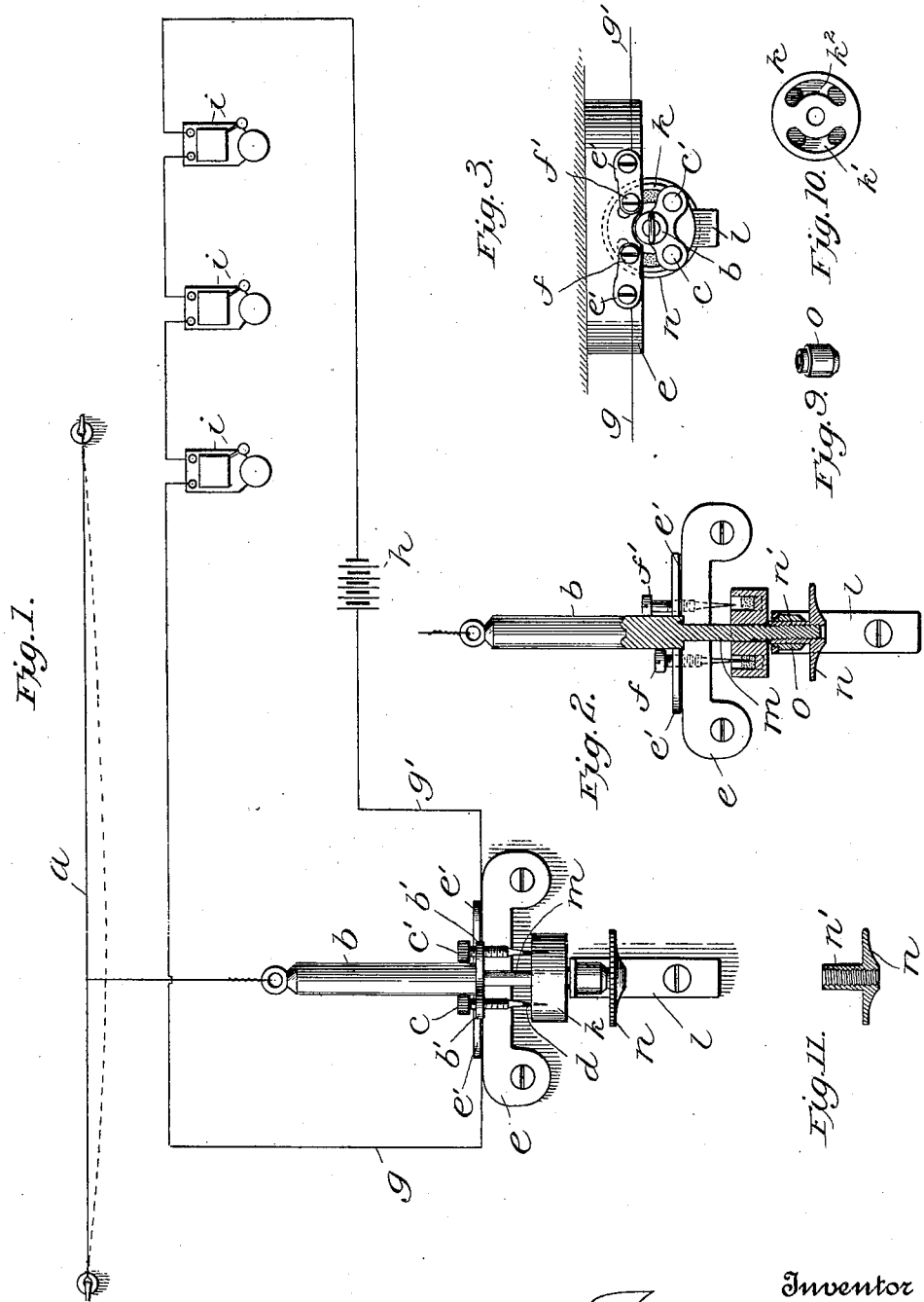

No. 655,411. Patented Aug. 7, 1900.
J. O'MEARA.
ELECTRICAL DETECTOR FOR HEAT OR COLD.
(Application filed May 12, 1899.)
(No Model.) 2 Sheets—Sheet 2.
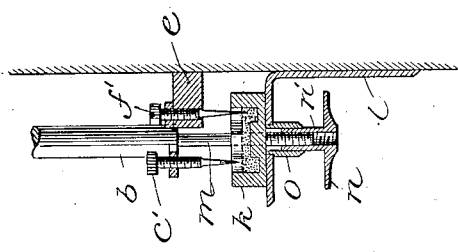
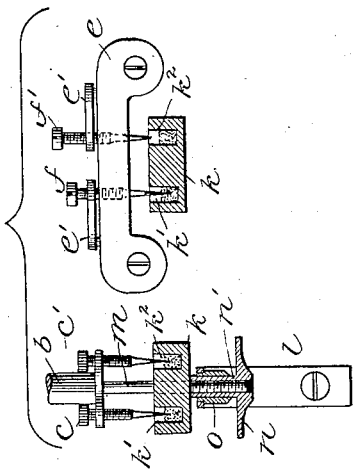
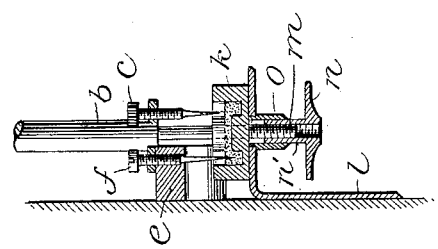
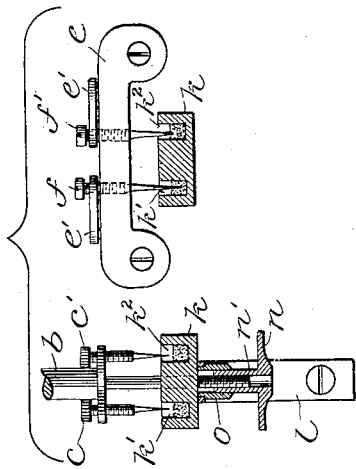
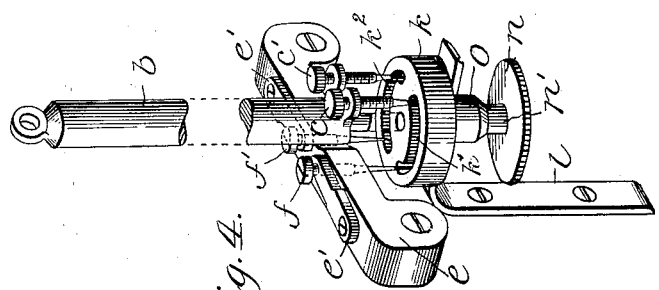

UNITED STATES PATENT OFFICE.

JEREMIAH O'MEARA, OF NEW YORK, N. Y.

ELECTRICAL DETECTOR FOR HEAT OR COLD.

SPECIFICATION forming part of Letters Patent No. 655,411, dated August 7, 1900.

Application filed May 12, 1899. Serial No. 716,540. (No model.)

*To all whom it may concern:*

Be it known that I, JEREMIAH O'MEARA, a citizen of the United States, residing at New York, in the county of New York and State of New York, have invented a certain new and useful Improvement in Electrical Detectors for Heat or Cold, of which the following is a full, clear, and exact description.

The object of this invention is to detect the presence of abnormal heat or cold in any given place and to give notice thereof at a distance.

The invention consists in a circuit-closer comprising a holder for an electric conductor and contact-points adapted to be engaged with the holder, between which points and the electric conductor in the holder the circuit may be closed upon the occurrence of abnormal temperature, the circuit including any suitable alarm mechanism, such as a bell or other signal, which is responsive to the operation of the circuit-closer.

The invention is herein shown as embodied in a weight suspended from a medium, such as wire, which is sensitive to heat and cold, and this weight carries two of the contact-points, while the complemental points are arranged upon a fixture adjacent to the weight, and the holder for the electric conductor is supported upon a fixture adjacent to the weight and the several contact-points and is also capable of being moved by the movement of the weight.

In the accompanying drawings, illustrating my invention, in the several views of which like parts are similarly designated, Figure 1 is an elevation showing one arrangement of my invention. Fig. 2 is an elevation and partial section showing parts of the circuit-closer alone, these views illustrating the use of my invention for the detection of abnormal cold. Fig. 3 is a top plan view. Fig. 4 is a perspective view of the circuit-closer. Fig. 5 is a side elevation of one side, and Fig. 6 is a side elevation of the other side, of said circuit-closer, the holder in said Figs. 5 and 6 being shown in section. Fig. 7 is a diagrammatic section showing the parts developed for use in detecting abnormal heat. Fig. 8 is a view similar to Fig. 7, showing the parts developed for abnormal cold, as in Figs. 1 and 2. Fig. 9 is a perspective view of a portion of the circuit-closer. Fig. 10 is a top plan view of the holder for the electric conductor.

The letter $a$ may represent a wire or a rod arranged horizontally or otherwise and of a material sensitive to changes in temperature. From this device is suspended a weight $b$, having the projections $b'$, in which are tapped the screws $c$ $c'$, which have, for convenience, milled heads and platinum or other highly-electrosensitive tips $d$.

$e$ is a non-conducting fixture provided with metal plates $e'$, in which are tapped the screws $f$ $f'$, and these screws $f$ $f'$ are of different lengths and project through the fixture $e$. Circuit-wires $g$ $g'$ lead from the plates $e$ $e'$ to any source of electricity, as a battery $h$, and any suitable signals or alarms, as electromagnetic bells $i$, are included in the circuit and may be located at any distant point from the circuit-closer.

$k$ is a cup-like holder, of rubber or other electrically non-conductive material and containing the separate cavities $k'$ $k^2$, each of which may be made of uniform depth, or, as shown in Fig. 10, of different depths, or made with pockets. This holder is designed to contain mercury or metallic powder or filings, and it is arranged to receive the four screws or contact devices $c$ $c'$ and $f f'$. This holder is arranged above a bracket $l$.

The weight has a stem $m$, which extends through a central opening in the holder $k$ and is screw-threaded to receive a button $n$, which is made with a tubular shank $n'$, which projects up through a hole in the bracket $l$, so as to come into contact with the bottom of the holder $k$ in order to raise and support said holder above the bracket $l$ when desired, and a stop-piece $o$ (shown detached in Fig. 9) may be interposed between the head of the button and the bottom of the bracket $l$ to limit the movement of said button.

If the device is to be used to detect abnormal cold—for example, to prevent freezing in a given place—the support $a$ will be arranged or adjusted in any suitable manner to have a normal sag, as indicated by dotted lines in Fig. 1, and the button will be turned, as in Figs. 1, 2, and 8, to raise the holder $k$ above the bracket *l* and support it. The contact-points *c c'* are arranged so as to project into the electrically-conductive material in the holder and one or the other of contact-points *f f'* is raised so as to be just outside of such material. By the contraction of the supporting device *a*, incident to the abnormal cold, the weight will be lifted and will carry with it the holder and the contact-points *c c'* and when it has been lifted sufficiently far to cause the elevated contact-point to be immersed in the conducting material in the holder the electric circuit will be completed and the alarm given. If, on the other hand, abnormal heat is to be detected, the support *a* will be arranged or adjusted in any suitable manner to be normally straight, substantially as shown in full line, Fig. 1, and the button will be screwed down, as shown in Figs. 4 to 7, until the holder is allowed to rest upon the bracket *l* with the contact-points *f f'* in the conducting material, and one or both of the contact-points *c c'* is or are elevated so as to be out of the conducting material in the holder, and then upon the support *a* sagging by expansion thereof, due to the occurrence of abnormal heat, the weight carries down the aforesaid elevated contact point or points into contact with the conducting material in the holder and the circuit is thereby closed. It will be observed that by a simple adjustment of the support *a* and parts of the circuit-closer the apparatus may be easily and readily set to detect either abnormal heat or abnormal cold by closing a circuit and sounding an alarm upon the occurrence of either. In either case upon restoration of normal temperature the circuit-closer is automatically thrown out of operation.

The advantage of using mercury or metallic powder or filings over plates is that such material is not subject to being rendered ineffective by dust.

The circuit-closer may be protected in any manner by inclosing same in any suitable casing.

By means of my device, which, it will be observed, is automatic in operation, refrigerator-rooms, wine-cellars, pantries, refrigerators, cold-storage plants, and other structures exposed to fire and to abnormal temperature may be guarded with great efficiency, and a series of structures may be connected with a single circuit-closer and be guarded thereby or individual circuit-closers may be used in individual structures and be wired up to an alarm or annunciator or other suitable telltale device.

What I claim is—

1. In an electrical apparatus for detecting abnormal temperatures, the combination of an atmospherically-sensitive wire or support, a weight suspended from said wire or support and carrying contact-points, a holder containing electrically-conductive material forming the terminals of an electric circuit, stationary adjustable contacts in said circuit, a stationary support for said holder, and a movable support for said holder adjustably connected to said weight, the said wire or support, contact-points and movable support for said holder capable of relative adjustment whereby the apparatus may be set either for the detection of abnormal heat or for the detection of abnormal cold, substantially as described.

2. An electrical apparatus for detecting abnormal temperatures, comprising a normally-open circuit, a suspended weight carrying contact-points, a holder for electrically-conductive material included in said circuit, a stationary support for said holder, and a movable support for said holder connected to said weight, combined with an atmospherically-sensitive supporting device for said weight, the said supporting device and movable support for said holder capable of relative arrangement and adjustment whereby the apparatus may be set either for the detection of abnormal heat or for the detection of abnormal cold, substantially as described.

3. An electrical detector for abnormal temperatures, comprising a weight carrying contact-points, an adjacent fixture also containing contact-points, a holder containing electrically-conductive material forming the terminals of an electric circuit and arranged to receive the said contact-points, a stationary support for said holder, and a movable support for said holder connected to said weight, combined with an atmospherically-sensitive supporting device for said weight, the said sensitive supporting device, contact-points and movable support for said holder capable of relative arrangement and adjustment, whereby the apparatus may be set either for the detection of abnormal heat or for the detection of abnormal cold, substantially as described.

4. An electrical detector for abnormal temperature, comprising a suspended body carrying contact-points, a holder for electrically-conductive material, and a button for adjusting said holder on said body, a fixture carrying contact-points arranged in conjunction with circuit-wires, an alarm included in said circuit-wires, and a support for said body constructed of material sensitive to changes in temperature, substantially as described.

5. An electrical detector for abnormal temperatures, comprising a weight carrying adjustable contact-points, an adjacent fixture also containing adjustable contact-points, a holder containing an electrically-conductive material forming the terminals of an electric circuit and arranged to receive one or more of said contact-points upon an occurrence of an abnormal temperature, a stationary support for said holder, and an adjustable, movable support for said holder connected to said weight, combined with an atmospherically-sensitive supporting device for said weight, the said sensitive supporting device, contact-points and movable support for said holder capable of relative arrangement and adjustment, whereby the apparatus may be set either for the detection of abnormal heat or for the detection of abnormal cold, substantially as described, In testimony whereof I have hereunto set my hand this 11th day of May, A. D. 1899.

JEREMIAH O'MEARA.

Witnesses:
 THOS. E. MOE,
 JOHN D. HOUSTON.